UNITED STATES PATENT OFFICE.

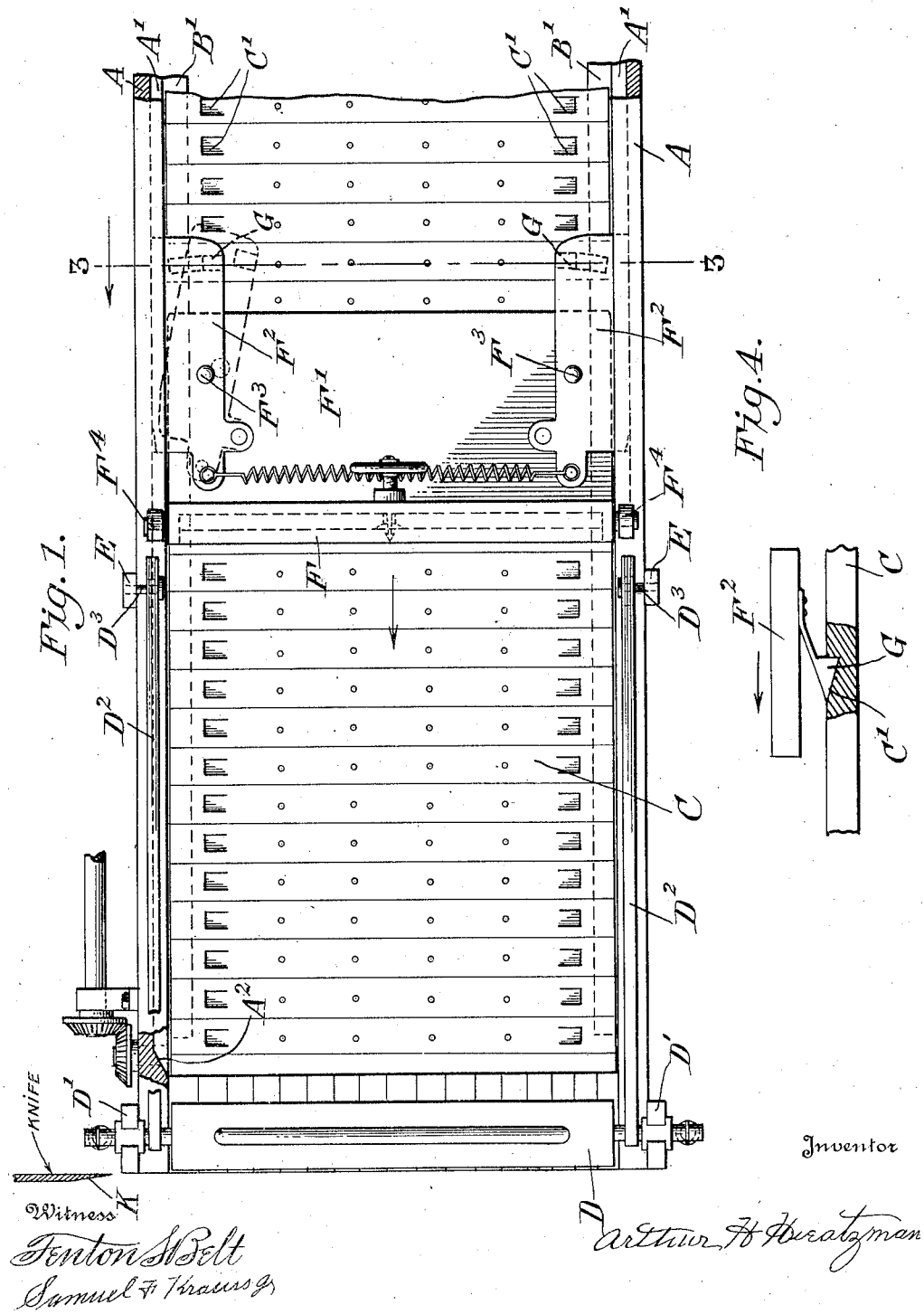

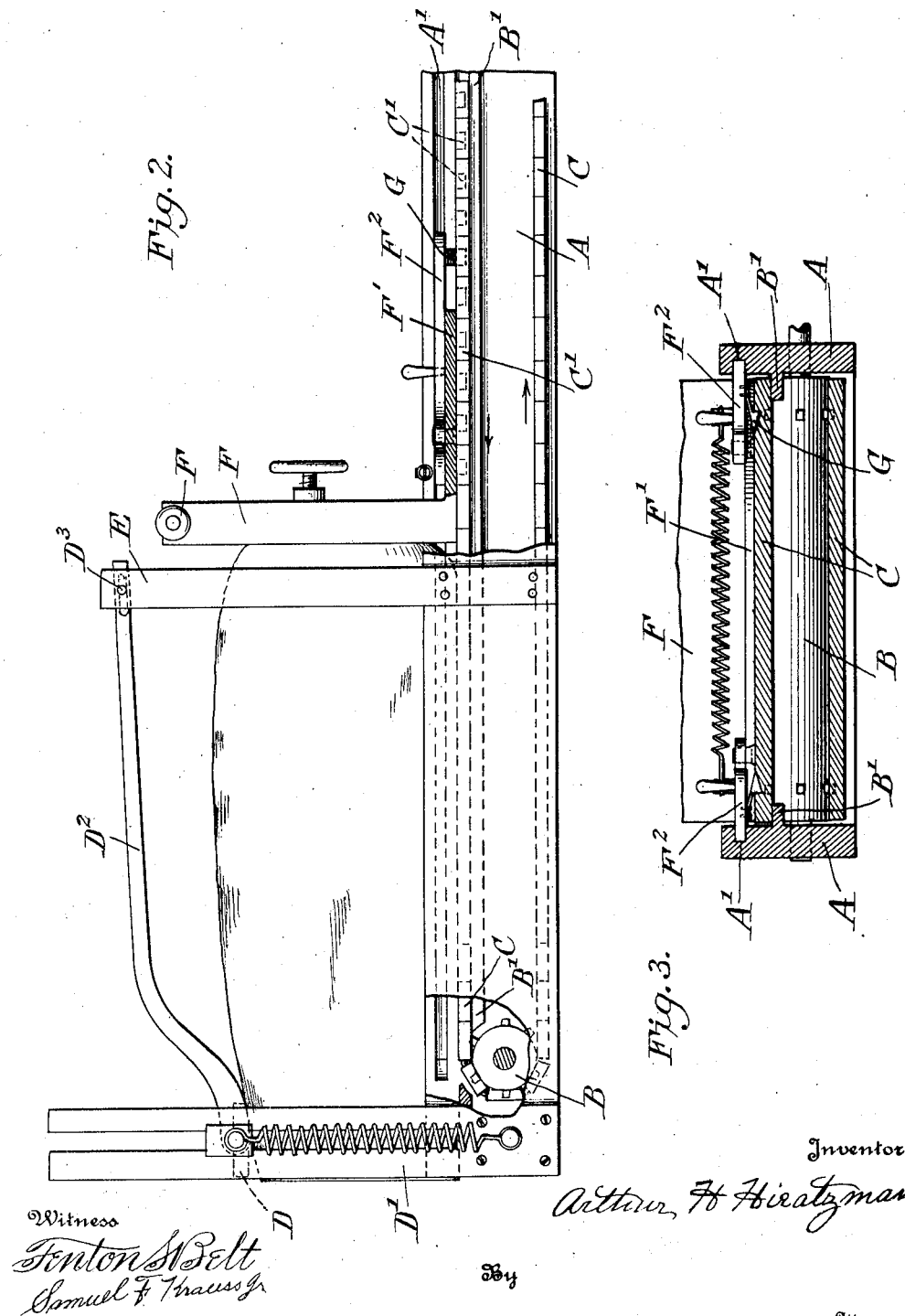

ARTHUR H. HIEATZMAN, OF BALTIMORE, MARYLAND.

MEAT-SLICING MACHINE.

1,339,623.   Specification of Letters Patent.   Patented May 11, 1920.

Application filed October 29, 1917. Serial No. 199,075.

*To all whom it may concern:*

Be it known that I, ARTHUR H. HIEATZMAN, a citizen of the United States, residing at Baltimore city, in the State of Maryland, have invented certain new and useful Improvements in Meat-Slicing Machines, of which the following is a specification.

My invention relates to improvements in meat slicing machines, and has for its object to provide a reciprocating meat carriage having a presser bar to hold the meat firmly at the cutting end, and a conveyer carrying a detachable meat engaging means which grips the rear end of the meat and assists in feeding the same forward, the said gripping means being so constructed as to be easily and quickly removed when desired.

Another object is to provide the carriage or table with a simple mechanism which will enable the gripper or holder to automatically raise the presser bar out of its path so as to present the end of the piece of meat to the slicing knife.

With these and other objects in view, the present invention consists in the combination and arrangement of parts as will be hereinafter more fully described, shown in the accompanying drawings and particularly pointed out in the appended claims.

In the drawings:

Figure 1 is a top plan view of my invention.

Fig. 2 is a side elevation, partly in section.

Fig. 3 is a sectional view on line 3—3 of Fig. 1, and

Fig. 4 is a detail view, showing one of the locking lugs.

Referring to the drawings by letter, A represents the frame of a reciprocating meat carriage, in the forward end of which is mounted a feed roller B, over which passes an endless conveyer C which is supported by the ribs B′ of the frame. A spring-pressed holding bar D is mounted for vertical movement in the standards D′ and is adapted to press down upon the forward end of the piece of meat. Pivoted to outer ends of the presser bar D are two levers D², whose inner ends are slotted and supported on pins D³ at the upper ends of posts E secured to the sides of the frame A. The meat holding and feeding member F has a base plate F′ which is adapted to rest upon the conveyer C, and has pivoted on its upper face two spring-actuated clamping plates F² which are adapted to slide in channels A′ in the frame A, and to the under rear ends of the plates F² are secured spring locking lugs G which engage recesses C′ in the slats of the conveyer C and cause the meat holding member F to travel with the conveyer. (The meat holding means of the feeding member F is the subject-matter of a separate application filed by me at this time.)

When it is desired to remove the meat holding member F it is only necessary to press the handles F³ together, which will move the plates F² from the channels A′ and the holder may be lifted out.

Mounted for rotation on the upper end of the frame of the holder F are two anti-friction rollers F⁴, which are adapted to engage the under surfaces of the levers D² and raise the presser bar D high enough to allow the meat holder F to pass freely under the bar D, in order that the end of the piece of meat may be presented to the knife K and be sliced.

The forward ends of the channels A′ terminate in cams A², which will contact with the plates F² and move the lugs G out of engagement with the recesses C′ in the conveyer, and automatically stop the forward movement of the meat holder at a predetermined point, so as to prevent its getting into the path of the slicing knife K and thereby damaging the same, the conveyer being permitted to move freely without further feeding the said meat holder.

Having described my invention, what I claim and desire to secure by Letters Patent is:

1. In a meat slicing device, a frame provided with channels having cam surfaces, a conveyer mounted for movement along the frame, a plate detachably mounted upon the conveyer and having means for engaging a piece of meat, lugs pivotally mounted on the plate and spring means connecting the lugs together whereby they are normally held in the channels of the frame and thrown out by the cam surfaces.

2. A meat slicing device, comprising a frame, means mounted upon the frame and adapted to engage the upper side of a piece of meat, means mounted upon the frame for advancing the meat along the same, a conveyer mounted for movement along the frame, a meat securing means carried by said device, a lever mechanism connected with the frame and engageable by the meat securing device for releasing the meat from the retaining device.

3. A meat slicing device, comprising a frame, a spring retained meat securing device mounted for vertical movement upon the frame, a conveyer mounted for movement longitudinally of the frame, a meat advancing means mounted on the conveyer, and means for disconnecting the advancing means from the conveyer when the said advancing means approaches the vicinity of the retaining means.

4. A meat slicing device, comprising a frame, spring retained meat engaging means mounted on the frame, a lever pivotally connected with the said means and the frame, a conveyer mounted for movement along the frame, a meat advancing means mounted on the conveyer and including an arm provided with a member adapted to engage the lever when the advancing means approaches the meat retaining means to move the meat retaining means to release the meat.

5. In a meat slicing device, a frame, an endless conveyer mounted for movement along the frame, a holder for engaging a piece of meat detachably mounted for movement along the frame and an engaging means for moving said holder in unison with the said conveyer.

6. In a meat slicing device, a frame, an endless conveyer mounted for movement along the frame, a holder for engaging a piece of meat detachably mounted for movement along the frame, an engaging means for moving said holder in unison with the said conveyer and an automatic means for disengaging the said holder at a pre-determined point.

7. A meat slicing device comprising a reciprocating carriage, an endless conveyer mounted thereon, a meat holder, and means intermediate the conveyer and holder for causing the same to move forward together.

8. In a meat slicing device comprising a carriage, an endless conveyer mounted thereon, a meat holder, and means thereon for engaging a piece of meat, automatic means intermediate the conveyer and holder for causing the latter to move forward in unison with the carriage.

9. In a meat slicing device comprising a carriage, an endless conveyer mounted thereon, a meat holder, and means thereon for engaging a piece of meat, automatic means intermediate the conveyer and holder for causing the latter to move forward in unison with the carriage, and means for guiding the holder.

10. In a meat slicing device comprising a carriage, an endless conveyer mounted thereon, a meat holder, and means thereon for engaging a piece of meat, automatic means intermediate the conveyer and holder for causing the latter to move forward in unison with the carriage, said carriage having standards, and a yielding holder bar carried thereby.

11. In a meat slicing device comprising a carriage, an endless conveyer mounted thereon, a meat holder, and means thereon for engaging a piece of meat, automatic means intermediate the conveyer and holder for causing the latter to move forward in unison with the carriage, said carriage having standards, a yielding holding bar, levers connected to said holding bar at their forward ends, and upright members with which the inner ends of said levers have sliding pivotal connection.

12. A meat slicing machine comprising a carriage, an endless slat conveyer mounted upon the frame, a holder for engaging a piece of meat mounted upon the frame, means for guiding the holder, the slats of the conveyer provided with notches, resilient members carried by the holder and adapted to engage said notches in the conveyer.

In testimony whereof I affix my signature in the presence of two witnesses.

ARTHUR H. HIEATZMAN.

Witnesses:
JAMES A. MURRAY,
SAMUEL F. KRAUSS, Jr.